United States Patent [19]

Detwiler

[11] 4,306,826

[45] Dec. 22, 1981

[54] LIFT FOR USE IN PROCESSING BUFFED TIRES

[75] Inventor: Richard H. Detwiler, S. Windham, Me.

[73] Assignee: Noyes Tire Co., Westbrook, Me.

[21] Appl. No.: 182,150

[22] Filed: Aug. 28, 1980

[51] Int. Cl.³ .............................................. B05B 13/02
[52] U.S. Cl. ...................................... 414/27; 118/320; 156/394 R; 414/391; 414/590; 414/910; 211/20; 269/57
[58] Field of Search ......................... 34/104, 105, 106; 118/320–322; 156/96, 394; 211/20, 23, 24; 224/42.06; 269/50–52, 55–57; 414/331, 589, 590, 615, 910, 27, 391, 908, 911, 426–431

[56] References Cited

U.S. PATENT DOCUMENTS

| | | | |
|---|---|---|---|
| 1,850,238 | 3/1932 | Maynard | 118/320 |
| 2,271,855 | 2/1942 | Cleveland et al. | 34/105 |
| 2,734,553 | 2/1956 | Rawls | 156/96 |
| 2,852,151 | 9/1958 | Smith | 414/590 |
| 3,696,949 | 10/1972 | Leblond et al. | 414/331 |
| 3,753,821 | 8/1973 | Ragen | 156/96 |
| 3,878,023 | 4/1975 | Dexter | 156/394 |
| 3,976,532 | 8/1976 | Barefoot | 156/405 |
| 4,123,306 | 10/1978 | Landry | 156/96 |

*Primary Examiner*—John E. Kittle

[57] ABSTRACT

A lift for use in such buffed tire processing operations as inspection, repair and cementing thereof has a carriage supported by a vertical post so as to be moved as by a ram between a lower inoperative position and an upper operative position. A pair of horizontal, motor driven shafts are connected to the carriage and in the inoperative shaft position, a buffed tire or tires supported by the free end of a hanger of a mobile rack may be brought into a position in which the shafts extend freely therethrough. In the operative position of the carriage, the tire or tires through which the shafts extend are supported entirely thereby so that they may be rotated and processed and the carriage then lowered until the processed tires are again supported by the hanger of the mobile rack.

9 Claims, 5 Drawing Figures

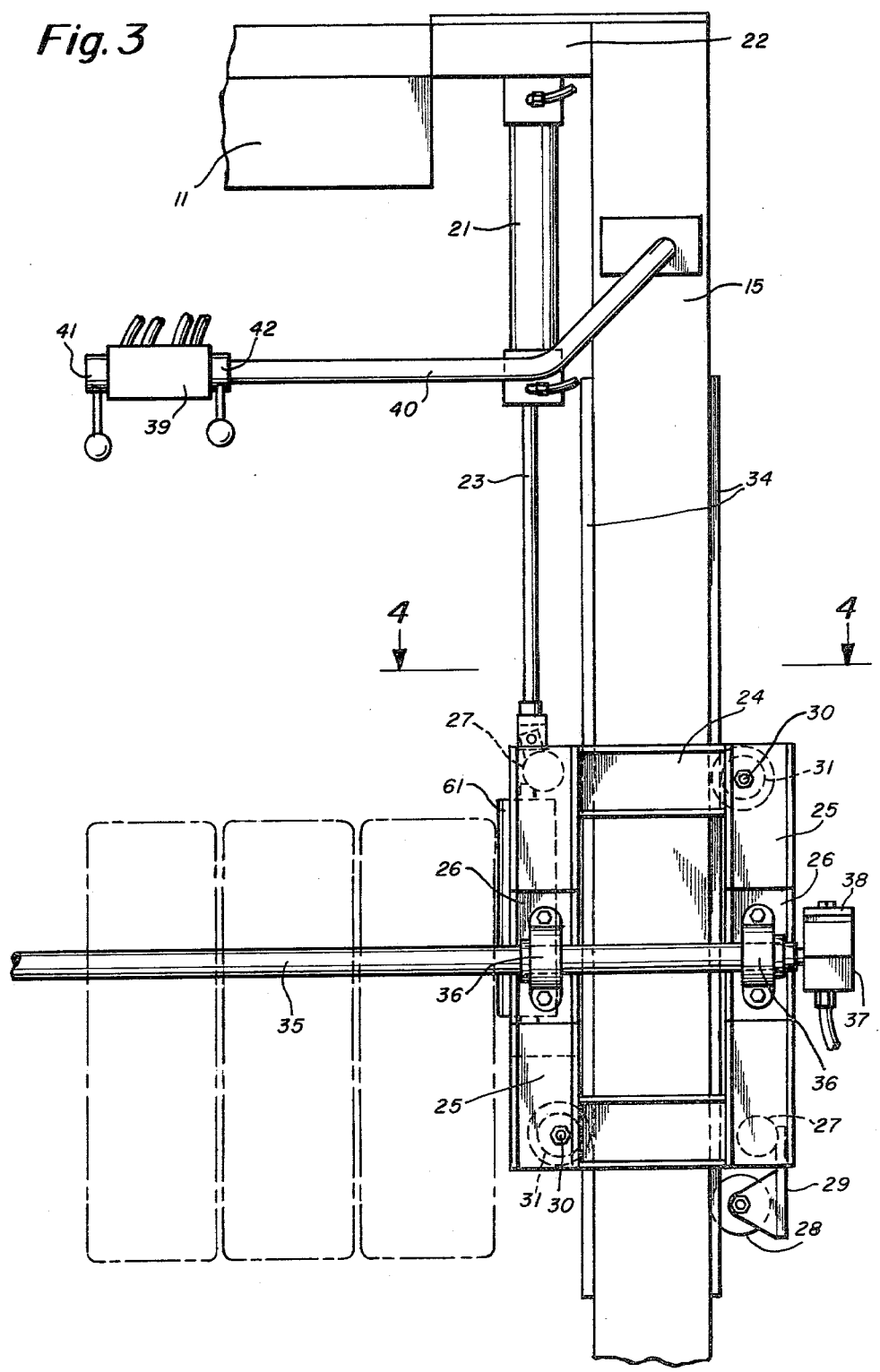

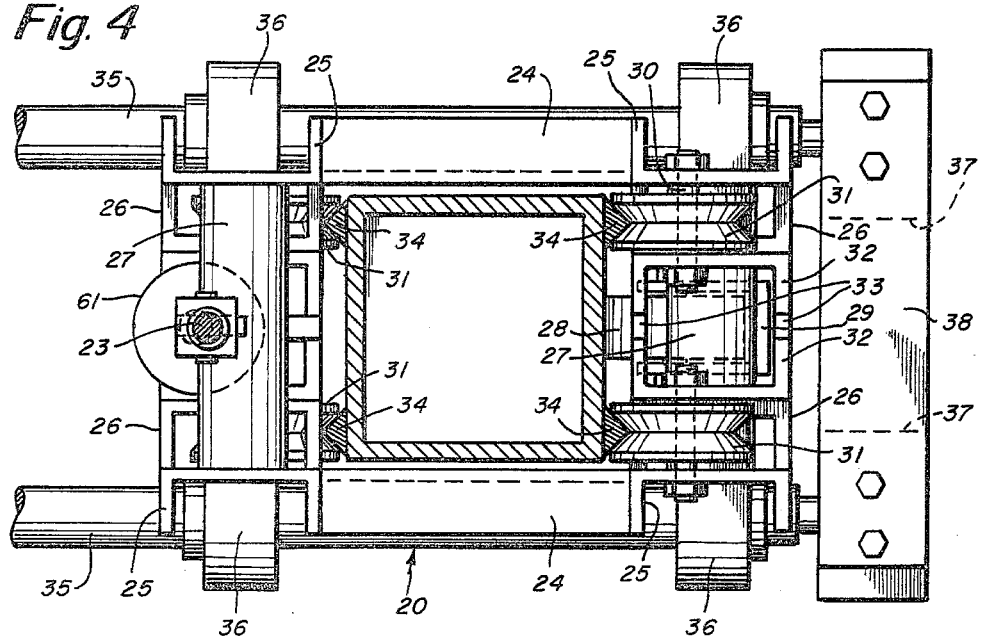
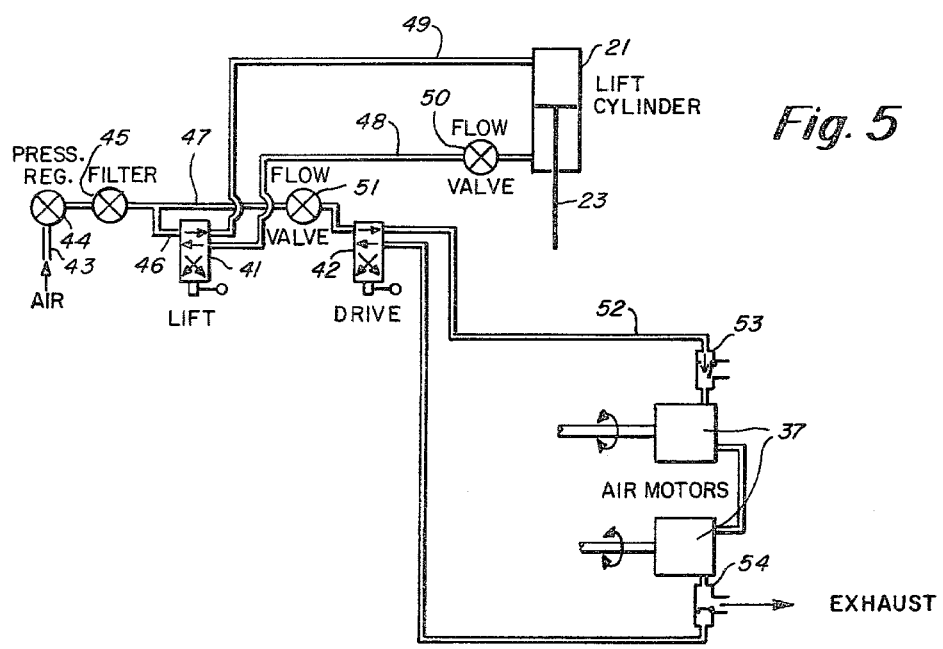

LIFT FOR USE IN PROCESSING BUFFED TIRES

BACKGROUND REFERENCES

U.S. Pat. No. 2,734,553
U.S. Pat. No. 3,753,821
U.S. Pat. No. 3,878,023
U.S. Pat. No. 3,976,532

BACKGROUND OF THE INVENTION

In the retreading of tires, tires that have been buffed are subjected to the processing of their tread and upper side wall portions by inspection, repair, if necessary, and cementing.

Tires that have been buffed are placed on mobile racks. A typical modile rack has a lengthwise centrally supported hanger with a plurality of tires carried by each of the free ends thereof. For the above referred-to processing operations, the tires must be transferred to suitable means by which they may be rotated.

Cementing operations, for example, are carried out in a spray booth provided with a stand having a pair of horizontal side-by-side motor driven shafts at a height such that tires of a predetermined maximum size may be supported and rotated thereby. In the case of truck tires which may weigh one hundred pounds or more, the manual transfer of tires between the hanger of a mobile rack and the shafts of the stand is strenuous work and lengthens the time required to effect the spraying of the group of tires with the highly volatile cement.

THE PRESENT INVENTION

The general objective of the present invention is to provide a lift operable to enable a tire or tires to be removed from the free end of a mobile rack hanger, prrocessed, and again become rack supported.

In accordance with the invention, this objective is attained with a lift having a vertical post provided with a carriage movable by power operated means between a low inoperative position and an elevated operative position. The carriage has a pair of transversely spaced, horizontal shafts coupled to shaft rotating means with the inoperative position of the shafts such that the rack may be so moved as to position the tire or tires supported by the rack hanger with the shafts extending freely through them. The operative position of the shafts is such that the tire or tires are lifted by the shafts free of the hanger and processed with the shaft rotating means operating after which the carriage is lowered with the tire or tires again rack supported.

Another objective of the invention is to provide for the positioning of the rack relative to the lift in a manner such that the end of the hanger from which a tire or tires are to be lifted is substantially parallel to and in a vertical plane between them. This objective is attained with the lift provided with a base extending a substantial distance below the shafts, preferably supporting them as cantilevers, and provided with guide means engageable by the rack to enable the wanted positioning of the rack hanger to be easily effected.

Other objectives of the invention and the means by which they are achieved will be apparent from the drawings, the following description of the preferred embodiment, and the appended claims.

BRIEF DESCRIPTION OF THE DRAWINGS

The preferred embodiment of the invention is illustrated by the accompanying drawings of which

FIG. 3 is a fragmentary view showing the carriage of the lift as viewed from the front thereof;

FIG. 4 is a section, on a further increase in scale, taken approximately along the indicated line 4—4 of FIG. 3; and FIG. 5 is a schematic view of the pneumatic system by which the lift is operated and shaft rotation effected.

THE PREFERRED EMBODIMENT OF THE INVENTION

Tires being retreaded are, after being buffed, inspected, their tread and upper side wall portions repaired, if necessary, and then sprayed with cement. The invention is illustrated and described in connection with the spraying of buffed tires with cement. Because of the volatile nature of the spray, it is necessary that the spraying be effected in a booth, generally indicated at 10 and having a hood 11 provided with a stack 12 equipped with an exhaust blower, not shown.

Figure 1:
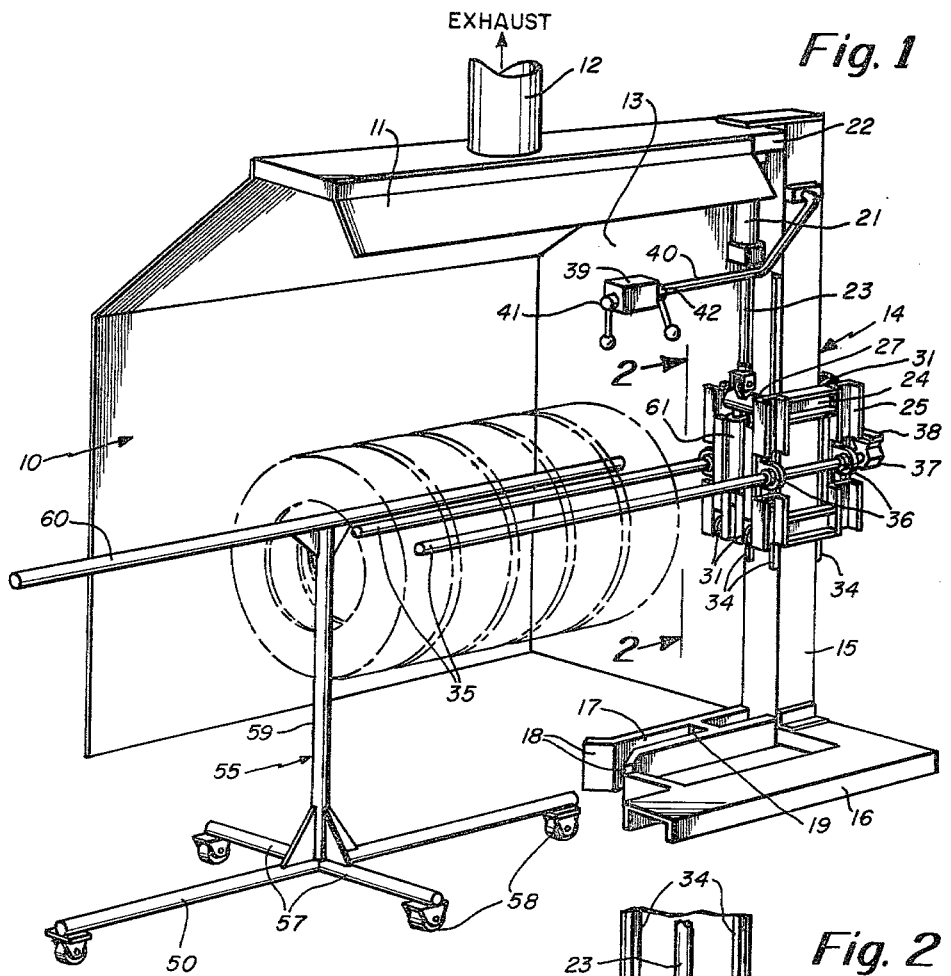
FIG. 1 is a perspective view of a spray booth provided with a lift in accordance with the invention and showing a mobile rack positioned to have tires carried thereby elevated and rotated.
Figure 2:
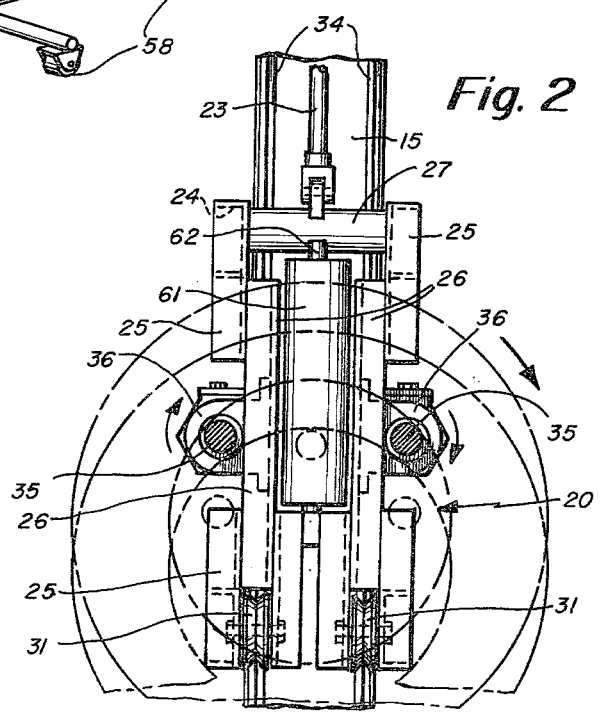
FIG. 2 is a fragmentary section, on a substantial increase in scale, taken approximately along the indicated line 2—2 of FIG. 1.

One end of the booth is open and the other end is partially closed by an end wall 13 adjacent the outer edge of which there is a lift, generally indicated at 14 in FIG. 1. The lift 14 has a vertical post 15 mounted on one end of a base 16 which extends a substantial distance towards the open end of the booth and is provided with a channel 17 opening towards that end with its open end flared as at 18. The channel 17 is provided with a stop 19 spaced a predetermined distance from the post 15.

The post 15 is shown as hollow and as rectangular in cross section and the lift has a carriage, generally indicated at 20 slidably mounted thereon for vertical movement by means of an air-operated ram, the cylinder 21 of which is shown as secured as at 22 to the upper end of the post 15 and the piston rod 23 of which is connected to the carriage 20 and is operable to raise and lower the carriage between its low, inoperative position, illustrated by FIG. 1, and its upper, operative position illustrated by FIG. 3.

The carriage 20 has upper and lower transverse members 24 of channel stock in front and in back of the post 15 with each having a vertical member 25 of the same stock welded to each end thereof. Each end member 25 extends towards the corresponding member 25 vertically aligned therewith and is connected thereto by a bridging member 26 of the same channel stock. On the inside of the post 15, the side facing the open end of the booth, the upper members 24 are interconnected by a transverse member 27 to which the rod 23 of the ram is connected. At the opposite or outside of the post 15, the lower members 24 are interconnected by a like transverse member 27 to which a post-engaging roller 28 is connected as at 29.

Each of the lower members 24 at the inside of the post 15 and each of the upper members 24 at the opposite side of the post supports one end of an axle 30 carrying a wheel 31. The other end of each axle 30 is supported by a short section 32 of channel stock welded to the associated bridging member 26. The shaft supporting sections 32 at each side of the post are interconnected as at 33. The wheels 31 are of the type having a grooved rim that is V-shaped in cross section and these travel along rails 34 extending along the side edges of the inside and outside of the post 15. The roller 28 fits between the outside rails 34.

The lift has a pair of horizontal shafts 35, one secured to the front of the carriage 20 and the other to the back thereof by bearing units 36 secured to the associated bridging members 26 in positions placing the shafts 35 in the same transverse plane. The shafts extend as cantilevers from the inside of the post 15 a substantial distance into the hood 10 and a short distance from the outside thereof where each is connected to the appropriate one of the two reversible air motors 37 carried by the shaft-supported mount 38.

A valve body 39 is supported by a pipe 40 attached to the post 15 and placing the valve body in a position above but adjacent the carriage 20 in which its two valves 41 and 42 can be conveniently operated. As schematically shown in FIG. 5, air under pressure from a source, not shown, is delivered by a conduit 43 through a pressure regulator 44 and a filter 45 to branch lines 46 and 47.

The branch line 46 includes the valve 41 which is in control of the lines 48 and 49 to the ram cylinder 21 and is operable to effect the raising and lowering of the carriage 20. The line 49 has a regulator 50 enabling the flow from the cylinder 21 to be so regulated to provide a wanted rate of cariage descent.

The line 47 includes a flow regulator 51 and the valve 42 is connected thereby to a loop 52 with the valve 42 operable to effect air flow in either direction therethrough thus to so operate the air motors 37 which are incorporated therein as to effect rotation of the shafts 35 in wanted directions. The air motors 37 are located between valves 53 and 54 with the valve 54 of a type operable when the air flow through the loop is in the direction shown as effected by the valve 42, to open the loop downstream of the air motors 37 to atmosphere and the valve 53 of the same type but operable to open the loop to relief when the air flow through the air motors is in the opposite direction.

A conventional mobile rack, generally indicated at 55 consists of a base having a lengthwise member 56 and shorter transverse members 57 connected to the middle thereof. The free ends of the members 56 and 57 are provided with casters 58. Centrally of the base of the rack there is a post 59 in support of hanger 60 extending lengthwise of the base and shown as extending a short distance beyond the ends of the base member 56. The hanger 60 is spaced above the base a distance such that tires of a predetermined maximum outside diameter may be hung thereby, five on each side of the post 50 by way of example and not of limitation.

With five tires supported on each free end of the hanger 60, the rack 55 is then pushed under the hood with one end of the base member 56 entrant of the channel 17 of the base and against the stop 19. It will be seen from FIG. 1 that the shafts 35 are so spaced that they may extend through a tire of a predetermined minimum diameter and that in the lower, inoperative position of the carriage 20, the shafts 35 are positioned and of such length as to enable them to extend through the five tires held by the proximate end of the hanger 60. As the tire at the free end of the hanger 60 adjacent the post 15 might otherwise come in contact with the carriage 20, the inside thereof is protected with a vertically disposed roller 61 the axle 62 of which is shown as anchored to the associated member 27 and to the subjacent members 32.

The operator then raises the carriage 20 until the shafts 35 lift the five tires from the hanger 60 and then activates the air motors with the shafts now operable to turn the tires in a wanted direction while inspected and sprayed. The sprayer is not shown and it may be of various types. If desired, the direction of tire rotation can be quickly reversed. When the spraying operations are completed, the carriage 20 is lowered so that the sprayed tires are again supported by the hanger 60. The rack may then be pulled from the booth, reversed, and re-entered into position in the booth enabling the five tires at the opposite end of the hanger 50 to be similarly processed.

I claim:

1. A tire lift for use in processing a predetermined maximum number of buffed tires supported by the free end of a hanger of a mobile rack, said lift including a base, a vertical post supported by said base, a carriage slidably attached to said post, a pair of horizontal shafts rotatably supported by said carriage and closely spaced in a transverse plane, power operated means connected to one end of at least one shaft and operable to rotate it, said shafts otherwise free and of substantial length thus to enable said number of tires to be accommodated thereon, means connected to said post and said carriage and operable to raise and lower said carriage between a low, inoperative position and an elevated operative position at a height such as to enter freely through any tire on the free end of said hanger when the rack is so positioned as to effect such entry and said shafts, in said operative carriage position, supporting any such tire free of said hanger enabling the rotation and processing thereof, the carriage when returned to its inoperative position leaving any processed tire again supported by the mobile rack hanger, and said base underlying the tire supporting portions of said shafts to an extent such that the said shafts are cantilevers enabling said maximum number of tires to be held thereby and said base so formed and disposed as to enable said rack to be brought into position without interference therefrom to permit tire transfers to and from said shaft with the free end of the hanger close to the post.

2. The tire lift of claim 1 in which the carriage includes a vertical roller on the side from which the shafts extend positioned to be engaged by a tire supported by the hanger of the rack or by the shafts.

3. The tire lift of claim 1 in which the base includes a stop engageable by the mobile rack when so positioned that the hanger is in a vertical plane between the shafts.

4. The tire lift of claim 1 in which the mobile rack is of the type having a base consisting of an elongated member having a caster at each end and side members extending at right angles to the elongated member with each side member having a caster at its free end and the base has an open ended, central channel disposed and dimensioned to receive a caster of the elongated member, the closed inner end of the channel constituting a stop and the open end of the channel outwardly flared.

5. The tire lift of claim 1 in which both shafts are rotated by said shaft rotating means.

6. The tire lift of claim 5 in which the shaft rotating means includes reversible air motors, one for each shaft and connected thereto.

7. The tire lift of claim 6 in which a conduit from a source of air under pressure includes a manually operated valve, the air motors are arranged in series in said conduit to be operated in one direction when air is directed by said valve to effect air flow in a first direction through said conduit and in the opposite direction when the valve is positioned to reverse the air flow, and said conduit includes a valve for each motor, both motors between said valves, each valve operable to permit flow through said conduit in a direction opposite to the other and to vent the conduit when the flow is in the unpermitted direction.

8. The tire lift of claim 1 in which the post is rectangular in cross section and includes guide rails on the face from which the shafts extend and on the opposite face, and the carrige includes rectangular framework, wheels carried by the lower part of the framework in engagement with the rack on the first named face and wheels carried by the upper part of the framework in engagement with the rack on said opposite face, and said carriage raising and lowering means connected to the upper part of the carriage centrally of said first named face.

9. The tire lift of claim 7 in which the means operable to raise and lower the carriage includes an air operated, piston-cylinder unit and means to deliver air thereto from said source to said cylinder to effect the raising and lowering of said carriage and including a manually operable direction control valve, said valve and the manually operated valve in control of shaft rotation both located adjacent the post and above the position of tires on said shaft.

* * * * *